Patented June 7, 1932

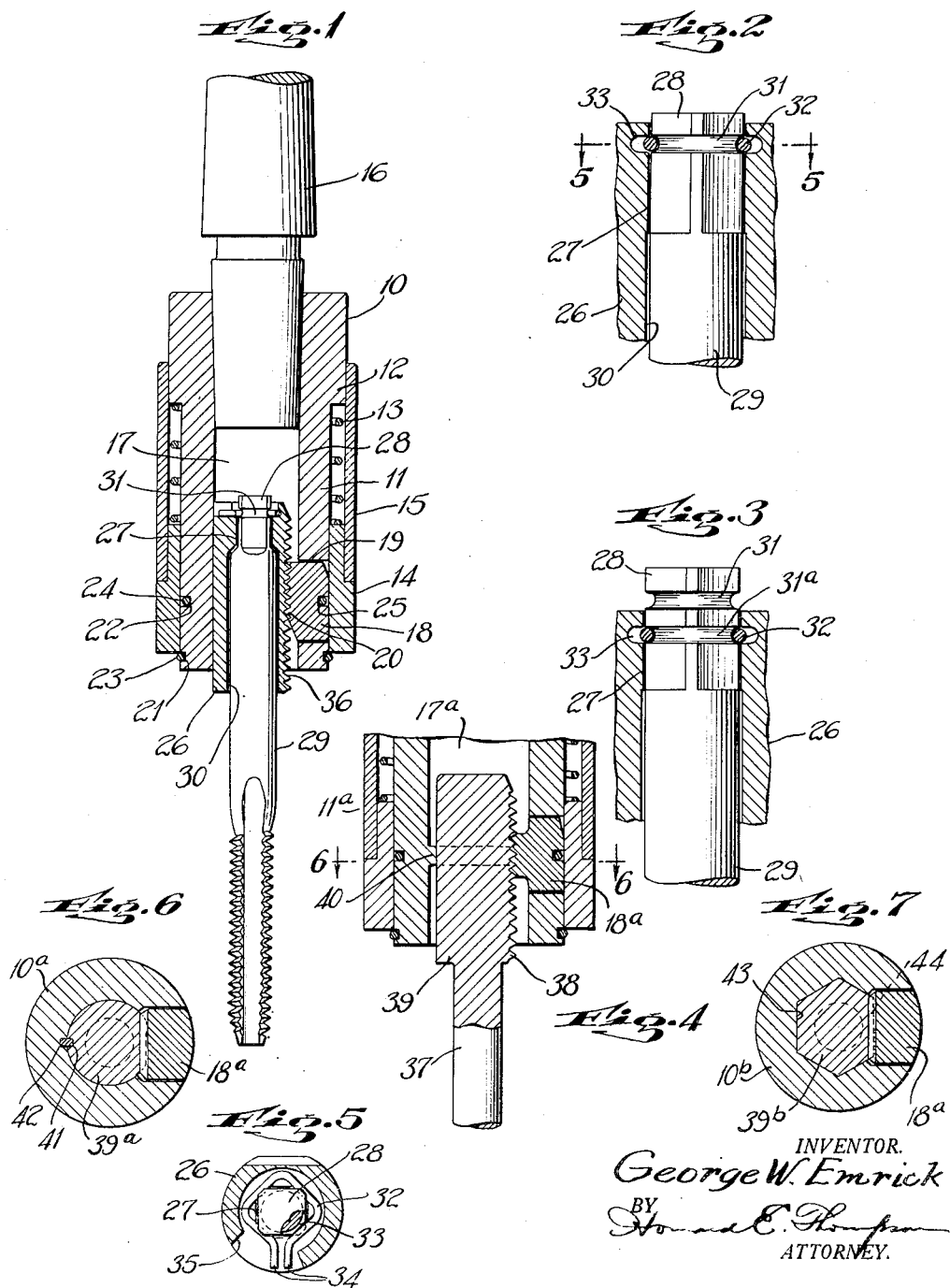

1,862,337

UNITED STATES PATENT OFFICE

GEORGE W. EMRICK, OF BROOKLYN, NEW YORK

TAP, DRILL, AND SIMILAR TOOL

Application filed January 28, 1931. Serial No. 511,781.

This invention relates to such tools as taps, drills, reamers, countersinks and the like; and the object of the invention is to provide a tool of the class described with means whereby the same may be adjustably supported in connection with a chuck device so as to adjust or regulate the length of the protruding portion of the tool with respect to the chuck; a further object being to provide the shank portion of a tool of the class specified with a groove constituting a keyway to support the tool against displacement with respect to its support; a further object being to provide a tool of the class described with means for detachably supporting the same in connection with a tool adapter, the latter facilitating the adjustable mounting of the tool with respect to a chuck; a still further object being to provide means for adjustably supporting the tool with respect to the adapter; and with these and other objects in view, the invention consists in a tool of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a longitudinal, sectional view through a chuck showing one of my improved tools coupled therewith.
Fig. 2 is a sectional, detail view of a part of the structure shown in Fig. 1 on an enlarged scale.

Fig. 3 is a view similar to Fig. 2 showing a modification.
Fig. 4 is a view similar to Fig. 1 showing only a part of the construction and showing a modification.

Fig. 5 is a section on the line 5—5 of Fig. 2.

Fig. 6 is a section on the line 6—6 of Fig. 4, showing a part of the construction and illustrating a modification; and, Fig. 7 is a view similar to Fig. 6 showing another modification.

In Fig. 1 of the drawing, I have shown a chuck device of a structure suitable to support a tool made according to my present invention. This chuck device constitutes the subject matter of a companion application filed of equal date herewith and comprises a chuck body 10, which is tubular in form, the lower end portion 11 being reduced to form a shoulder 12 upon which a spring 13 seats. Said spring also operates upon a collar 14 slidable on the reduced portion 11 of the body 10, and carries a tubular housing 15 which encloses the spring 13 and fits upon the enlarged upper end of the body 10. Coupled with the upper end of the body 10 is a spindle 16, and in the lower end of said body is a tool receiving bore 17. A dog or key member 18 is supported in a radial aperture 19 formed in the reduced extension 11 of the chuck body, the member 18 having inwardly projecting teeth 20 on the inner surface thereof which extend into the bore 17 to support a tool in connection therewith as later described.

The periphery of the extension 11 is provided with two annular grooves 21 and 22, the groove 21 being adapted to receive a spring ring 23 forming a stop to limit the outward movement of the collar 14. A spring ring 24 is arranged in the groove 22 and also enters a corresponding groove 25 in the outer surface of the member 18, said surface being curved to correspond with the contour of the extension 11.

At 26, I have shown a tool adapter in the form of an elongated sleeve, the upper end of which is provided with a square bore 27 to receive the square end or head 28 of a tool 29. In Fig. 1 of the drawing, the tool 29 is represented as a tap, and when tools of this type are employed, it is preferred that the bore 30 of the sleeve 26 below the square bore 27 be slightly larger in diameter than the diameter of the shank of the tool to provide universal, radial movement of the tool so that it will find its own center in a workpiece.

In coupling the tool 29 with the adapter, I provide a groove 31 in the square head 28 thereof to receive a square spring ring 32 shown in detail in Fig. 5 of the drawing. This ring tensionally engages a groove 33 formed in the square bore 27 of the adapter and including radially projecting arms 34 operating in a notch or cut-out portion 35 in the upper end of the adapter.

The periphery of the adapter 26 is provided on one side thereof with longitudinally spaced teeth or projections 36 in connection with which the projections 20 on the member 18 operate to key and lock the adapter and tool in different positions of adjustment in the bore 17. The adjustment of the tool and adapter as well as its attachment and detachment with respect to the chuck body is made possible by raising the collar 14 out of engagement with the member 18, thus permitting said member to be forced outwardly or radially against the action of the spring 24, facilitating the movement of the adapter 26. When the collar 14 is in the position shown in Fig. 1 of the drawing, it retains the member 18 against outward radial movement and thus locks the tool in position.

In Fig. 3 of the drawing, I have shown a slight modification of the structure shown in Figs. 1 and 2 wherein the square end or head 28 of the tool 29 is provided in addition to the groove 31 with a similar groove 31a arranged inwardly of the first named groove, thus providing an adjustable mounting of the tool 29 with respect to the adapter. The spring 32 is adapted to seat in either groove, it being understood that this spring is rotatably supported in the groove 33 by means of the projecting fingers 34 to move the same from the locked position shown in Fig. 5 to a position wherein the square of the spring will register with the square bore 27 of the adapter in the corresponding square head 28 of the tool.

In Fig. 4 of the drawing, I have shown a modification in the form of the tool employed which eliminates the use of the adapter. In this construction, a tool 37 is provided at the upper end of the shank thereof with longitudinally spaced teeth or projections 38 preferably formed in an enlarged body portion 39. But, in some cases, this body portion may in fact be smaller than the diameter of the tool, it being understood that one form of shank on a tool may be applicable to tools of many sizes within certain limits, and all attachable with a chuck of one size. This is also true with respect to the adapter 26. In other words, one adapter suitable for use in one size of chuck may be used for supporting a comparatively large range in tool sizes which vary to the smallest fractions of an inch.

With the structure shown in Fig. 4 of the drawing, a dog or key member 18a similar to the member 18 will directly engage the teeth 38 of the tool 37. While the bore 17a of the reduced extensions 11a of the chuck shown in Fig. 4 may be straight in the use of some tools such as drills, this bore would preferably have an inwardly projecting annular ring 40 arranged in alinement with the member 18a as clearly seen so as to provide slight clearance of the head 39 in the bore 17 to provide the floating support of the tool, especially should the tool constitute a tap.

In Fig. 6 of the drawing, I have shown a modification of the structure disclosed in Fig. 4 wherein the enlarged portion 39a of the tool is provided with a longitudinal key way 41 to receive a key 42 arranged in the chuck body 10a so as to key the tool against rotation with respect to the body in addition to the key action provided by the member 18a.

In Fig. 7 of the drawing, another method of keying the tool to the body of the chuck is disclosed. In said figure, the enlarged end of the tool 39b is made hexagonal in cross sectional form and fits in a corresponding bore 43 of the chuck body 10b. One flat side of the hexagon head of the tool has the longitudinally spaced teeth or projections 44 which cooperate with the members 18a. The structures shown in Figs. 6 and 7 will be used preferably in cases where the tool is subjected to heavy stress or strain, and thus the member 18a need not function as a key for retaining the tool against rotation in the chuck body.

From the foregoing, it will be apparent that the distinctive feature of my invention resides in the provision of means on a tool of the class under consideration for adjustably supporting and keying a tool within and to a chuck body. While I have shown a specific method of attaching an adapter thereto as well as a specific structure applied to the tool itself, it will be apparent that my invention is not limited in these respects, and various other changes in and modifications of the construction herein shown and described, may be made within the scope of the appended claims without departing from the spirit of my invention or sacrificing its advantages.

Having fully described my invention, what I claim as new and desire to secure by Letters Patent, is:

1. A tap of the class described, the shank of which includes a portion provided with closely arranged, longitudinally spaced grooves, whereby said tap may be keyed to and adjustable longitudinally of a suitable support, and a spring ring engaging a groove in said tap in keying the same in connection with the support.

2. A tap of the class described, the end of the shank portion of which is angular in cross sectional form and provided with closely arranged, longitudinally spaced grooves whereby said tap may be keyed to and adjustable longitudinally of a support, and a spring ring of angular contour to receive the angular shank of said tool and adapted to enter one of said grooves in keying the tool to the support.

3. In a tapping tool of the class described, means on the shank portion thereof for adjustably mounting and keying the same in connection with a suitable support, said means involving longitudinally spaced coupling elements arranged in close proximity to each other on said shank and independent of the tapping threads of the tool.

4. In a tapping tool of the class described, means on the shank portion thereof for adjustably mounting and keying the same in connection with a suitable support, said means involving longitudinally spaced coupling elements arranged in close proximity to each other on said shank and independent of the tapping threads of the tool, and that part of the tool having the coupling elements thereon being flattened to prevent rotation of the tool in its support.

In testimony that I claim the foregoing as my invention I have signed my name this 22nd day of January, 1931.

GEORGE W. EMRICK.